(12) United States Patent
Greenwood et al.

(10) Patent No.: US 11,140,365 B2
(45) Date of Patent: Oct. 5, 2021

(54) VEHICLE IMAGING SYSTEM AND METHOD

(71) Applicant: Jaguar Land Rover Limited, Coventry (GB)

(72) Inventors: Jeremy Greenwood, Coventry (GB); Robin Boyd, Coventry (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 15/756,401

(22) PCT Filed: Aug. 18, 2016

(86) PCT No.: PCT/EP2016/069609
§ 371 (c)(1),
(2) Date: Feb. 28, 2018

(87) PCT Pub. No.: WO2017/036810
PCT Pub. Date: Mar. 9, 2017

(65) Prior Publication Data
US 2018/0278895 A1    Sep. 27, 2018

(30) Foreign Application Priority Data
Sep. 2, 2015  (GB) ..................... 1515527

(51) Int. Cl.
*H04N 7/18* (2006.01)
*B60R 1/00* (2006.01)
(52) U.S. Cl.
CPC .............. *H04N 7/183* (2013.01); *B60R 1/00* (2013.01); *B60R 2300/30* (2013.01);
(Continued)

(58) Field of Classification Search
CPC ...... H04N 7/181; H04N 19/61; H04N 19/172; H04N 19/164; H04N 19/17; G08G 1/166;
(Continued)

(56) References Cited

U.S. PATENT DOCUMENTS 9,096,175 B1    8/2015  Harris
2007/0124332 A1*  5/2007  Ballesty .............. B61L 27/0094
(Continued)

FOREIGN PATENT DOCUMENTS

| CN | 202911633 U | 5/2013 |
|---|---|---|
| KR | 10-2012-0018614 A | 3/2012 |
| WO | 2015017541 A1 | 2/2015 |

OTHER PUBLICATIONS

Patents Act 1977: Combined Search and Examination Report under Sections 17 and 18(3), UKIPO Application No. GB1515527.8, dated Feb. 8, 2016, 7 pp.
(Continued)

*Primary Examiner* — Farhan Mahmud
(74) *Attorney, Agent, or Firm* — McCoy Russell LLP

(57) ABSTRACT

The present disclosure relates to a vehicle imaging system (1). More particularly, the present disclosure relates to a video data transmitter (3) for use with a vehicle (V). The video data transmitter (3) comprises a camera (5) for generating video data ($D_V$). An image processor (15) is configured to process the video data ($D_V$) and a transmitter (14) is provided to transmit the processed video data ($D_{VP}$) to a video data receiver (2). The image processor (15) is configured to process the video data ($D_V$) in dependence on one or more operating parameter of the vehicle (V). The present disclosure also relates to a video data receiver (2); and to a method of controlling transmission of video data ($D_V$).

12 Claims, 2 Drawing Sheets

(52) U.S. Cl.
CPC ... *B60R 2300/306* (2013.01); *B60R 2300/406* (2013.01); *B60R 2300/802* (2013.01)

(58) Field of Classification Search
CPC ...... G08G 1/161; G07C 5/008; G01S 13/931; G01C 21/26; G05D 2201/0213; G05D 1/0246; G06K 9/00805; G06K 9/00791
See application file for complete search history.

(56) References Cited

U.S. PATENT DOCUMENTS

| | | |
|---|---|---|
| 2008/0180527 A1 | 7/2008 | Nixdorf et al. |
| 2010/0259371 A1 | 10/2010 | Wu et al. |
| 2014/0267727 A1 | 9/2014 | Alaniz |
| 2015/0210387 A1* | 7/2015 | Ling ............... G05D 1/0022 701/2 |
| 2016/0173805 A1* | 6/2016 | Claus ............... H04N 17/004 348/148 |

OTHER PUBLICATIONS

Patents Act 1977: Search Report under Section 17(6), UKIPO Application No. GB1515527.8, dated Apr. 26, 2016, 2 pp.
Patents Act 1977: Combined Search and Examination Report under Sections 17 and 18(3), UKIPO Application No. GB1614128.5, dated Jan. 12, 2017, 9 pp.
Patents Act 1977: Search Report under Section 17(6), UKIPO Application No. GB1614128.5, dated Jan. 31, 2017, 3 pp.
International Search Report and Written Opinion of the International Searching Authority, International Application No. PCT/EP2016/069609, dated Oct. 31, 2016, 11 pp.
European Patent Office, Office Action Issued in Application No. 16753397.5, dated Feb. 19, 2021, Germany, 7 pages.

\* cited by examiner

VEHICLE IMAGING SYSTEM AND METHOD

RELATED APPLICATIONS

This application is a 35 U.S.C. § 371 national stage application of PCT Application No. PCT/EP2016/069609, filed on Aug. 18, 2016, which claims priority from Great Britain Patent Application No. 1515527.8, filed on Sep. 2, 2015, the contents of which are incorporated herein by reference in their entireties. The above-referenced PCT International Application was published in the English language as International Publication No. WO 2017/036810 A1 on Mar. 9, 2017.

TECHNICAL FIELD

The present disclosure relates to a vehicle imaging system and method. More particularly, but not exclusively, the present disclosure relates to a video data transmitter; to a video data receiver; to a method of controlling transmission of video data; to a vehicle; to a trailer; and to a rig comprising a vehicle and a trailer.

BACKGROUND

It is known to provide a vehicle with one or more cameras, typically an optical camera, as a driver aid. Moreover, for vehicles towing a trailer, it is known to provide one or more cameras, such as an optical camera, on the trailer. The trailer-mounted cameras may be arranged to provide a view along respective sides of the trailer and/or in a region behind the trailer. The cameras generate video data at least substantially in real time which is output for display on a display screen in the vehicle. The images can help to reduce the formation of blind spots around the vehicle and trailer.

In the case of the trailer-mounted cameras, the video data may be transmitted wirelessly at least substantially in real-time, for example using a suitable radio frequency (RF) transmission protocol. However, there will be times when the RF transmission path is obstructed, attenuated or suffering from multipath distortion such that the bandwidth is reduced below that required to transmit the full quality image. Typically with a commercial wireless camera the response is to modify the compression algorithm to support the available bandwidth by reducing the frame rate or delaying the signal. However, this control strategy may not be appropriate when the camera is operating on a vehicle. For example, if the vehicle is travelling at speed, an approaching hazard may not be observed in a timely fashion.

It is against this backdrop that the present invention has been conceived. At least in certain embodiments the present invention seeks to overcome or ameliorate at least some of the shortcomings associated with prior art systems.

SUMMARY OF THE INVENTION

Aspects of the present invention relate to a video data receiver; to a video data transmitter; to a vehicle; to a trailer; to a rig comprising a vehicle and a trailer; and to a method of modifying video data.

According to a further aspect of the present invention there is provided a video data transmitter for use with a vehicle; the video data transmitter comprising:
 a camera for generating video data;
 an image processor configured to process the video data; and
 a transmitter for transmitting the processed video data to a video data receiver;
 wherein the image processor is configured to process the video data in dependence on one or more operating parameter of the vehicle. The video data is transmitted at least substantially in real-time and output to a display screen, typically disposed in a cabin of the vehicle for viewing by a vehicle driver or occupant. By controlling the processing of the video data, the video data transmitter may compensate for signal attenuation and/or distortion which may otherwise affect the transmission of the video data.

In an embodiment, processing the video data in dependence on one or more operating parameter of the vehicle may comprise processing the video data in dependence upon receipt, by the image processor, of a signal indicative of said operating parameter of said vehicle.

The video data generated by the camera may exceed the available bandwidth. The image processor is configured to process the video data in order to prioritise different aspects of the video image in dependence on the one or more operating parameter of the vehicle. The processing of said video data may comprise reducing the size of said video data to enable transmission within an available bandwidth.

The processing of said video data may comprise discarding a portion of said video data in dependence on one or more operating parameter of the vehicle. Alternatively, or in addition, the processing of said video data may comprise compressing said video data in dependence on one or more operating parameter of the vehicle. The processing of said video data may comprise processing said video data to modify one or more of the following: image resolution; colour content; response time (latency); and frame rate.

The one or more operating parameter of the vehicle may comprise one or more of the following: a vehicle reference speed; a direction of travel of the vehicle (forwards or reverse); a steering angle of the vehicle; and a hitch angle of the trailer.

At relatively high speeds, a high frame rate may be maintained to facilitate tracking of objects, vehicles etc. Also, maintaining the colour information may be advantageous when travelling at relatively high speeds to facilitate identification of objects, such as an emergency vehicle (having a white body and flashing lights). The image processor may be configured to modify the video data to provide a shorter response time (reduced latency), a relatively high frame rate, a medium colour content and a relatively low resolution when the vehicle reference speed is greater than or equal to an upper speed threshold. The upper speed threshold may be predefined, for example as a vehicle reference speed greater than or equal to 60 mph (approximately 100 km/h).

At relatively low speeds, a high image resolution may be maintained to facilitate identification of potential obstacles. The image processor may be configured to modify the video data to provide a longer response time (increased latency), a relatively low frame rate, a high colour content and a relatively high resolution when the vehicle reference speed is less than or equal to a lower speed threshold or the vehicle is reversing. The lower speed threshold may be predefined, for example as a vehicle reference less than or equal to 20 mph (approximately 30 km/h).

The image processor may be configured to modify the video data to provide a medium response time, a medium frame rate, a high colour content and a relatively low resolution when the vehicle reference speed is less than or equal to a lower speed threshold or the vehicle is reversing.

The image processor may thereby modify the video data such that the colour content and the resolution of the image are both relatively high. The lower speed threshold may be predefined, for example as a vehicle reference speed greater than or equal to 20 mph (approximately 30 km/h).

The image processor may be configured to modify the video data to provide an intermediate response time; an intermediate frame rate; a high colour content and a low pixel resolution when the vehicle reference speed is greater than the lower speed threshold and less than the upper speed threshold.

The video data transmitter may comprise a receiver for receiving a control signal from the video data receiver. The control signal may be generated in dependence on said one or more operating parameter.

The video data transmitter may comprise a receiver for receiving a control signal from the video data receiver comprising said one or more operating parameter.

The image processor may be configured to analyse said video data to determine said one or more operating parameter of the vehicle. The image processor may, for example, be configured to identify one or more element in the image and to track movement of said one or more element.

According to a further aspect of the present invention there is provided a trailer for coupling to a vehicle, wherein the trailer comprises one or more video data transmitter as described herein.

According to a still further aspect of the present invention there is provided a video data receiver for a vehicle, the video data receiver comprising:

a processor configured to receive one or more operating parameter of the vehicle;
 a receiver for receiving video data from one or more video data transmitter; and
 a transmitter for transmitting a control signal to the one or more video data transmitter;
 wherein the processor is configured to generate said control signal in dependence on said one or more operating parameter of the vehicle to control processing of the video data prior to transmission. The processor is configured to perform source processing of the video data prior to transmission.

The processor may be configured to generate said control signal to control processing of said video data to enable transmission within an available bandwidth.

According to a further aspect of the present invention there is provided a vehicle comprising a video data receiver as described herein.

According to a further aspect of the present invention there is provided a rig comprising a vehicle as described herein and a trailer as described herein.

According to a yet further aspect of the present invention there is provided a vehicle imaging system comprising a video data transmitter as described herein; and a video data receiver as described herein.

According to a still further aspect of the present invention there is provided a method of controlling transmission of video data from a video data transmitter to a video data receiver disposed in a vehicle, the method comprising:

determining one or more operating parameter of the vehicle;
 generating video data;
 processing the video data; and
 transmitting the processed video data to a video data receiver;
 wherein the video data is processed in dependence on said one or more operating parameter of the vehicle.

The processing of said video data may comprise reducing the size of said video data to enable transmission within an available bandwidth.

The processing of said video data may comprise discarding a portion of said video data in dependence on one or more operating parameter of the vehicle.

The processing of said video data may comprise compressing said video data in dependence on one or more operating parameter of the vehicle.

The processing of said video data may comprise modifying one or more of the following: image resolution; colour content; response time (latency); and frame rate.

The one or more operating parameter of the vehicle may comprise one or more of the following: a vehicle reference speed; a direction of travel of the vehicle (forwards or reverse); a steering angle of the vehicle; and a hitch angle of the trailer.

The processing of said video data may comprise modifying the video data to provide a shorter response time, a relatively high frame rate, a medium colour content and a relatively low resolution when the vehicle reference speed is greater than or equal to an upper speed threshold.

The processing of said video data may comprise modifying the video data to provide a longer response time, a relatively low frame rate, a high colour content and a relatively high resolution when the vehicle reference speed is less than or equal to a lower speed threshold or the vehicle is reversing.

The processing of said video data may comprise modifying the video data to provide a medium response time, a medium frame rate, a high colour content and a relatively low resolution when the vehicle reference speed is greater than the lower speed threshold and less than the upper speed threshold.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the present invention will now be described, by way of example only, with reference to the accompanying figures, in which.

DETAILED DESCRIPTION

Figure 1:
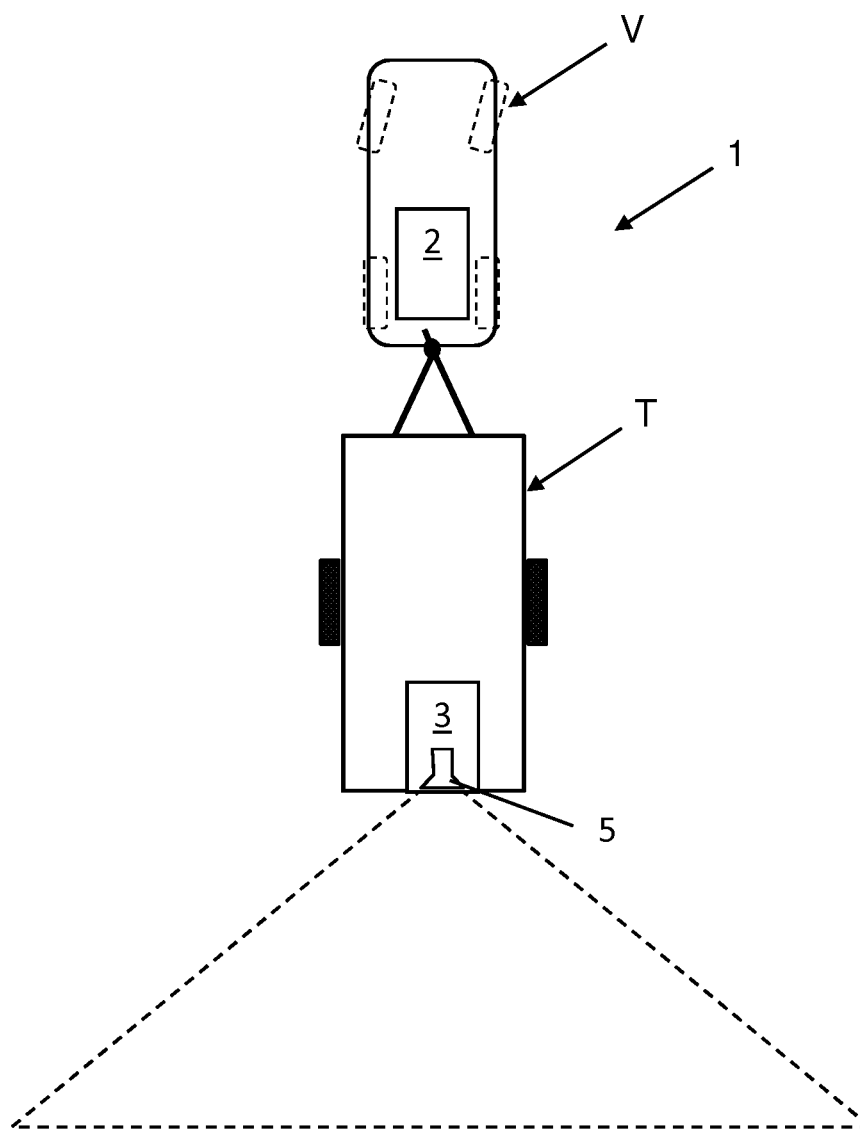
FIG. 1 illustrates schematically a vehicle and a trailer incorporating a vehicle imaging system in accordance with an embodiment of the present invention.

A vehicle imaging system 1 in accordance with an embodiment of the present invention will now be described with reference to FIGS. 1 and 2. The vehicle imaging system 1 has particular application in a vehicle V towing a trailer T (referred to in combination as a rig). The vehicle V in the present embodiment is an automobile or a utility vehicle.

However, it will be appreciated that the vehicle imaging system 1 may be incorporated into other types of vehicle, such as a tractor unit and a trailer.

The terms "front" and "rear" are used herein in their conventional sense when defining the relative position of features on the vehicle V and the trailer T. The terms "rear-facing" and "rear-view" are used herein to refer to a position or orientation which is in a direction towards the back of the vehicle V or the trailer T.

Figure 2:
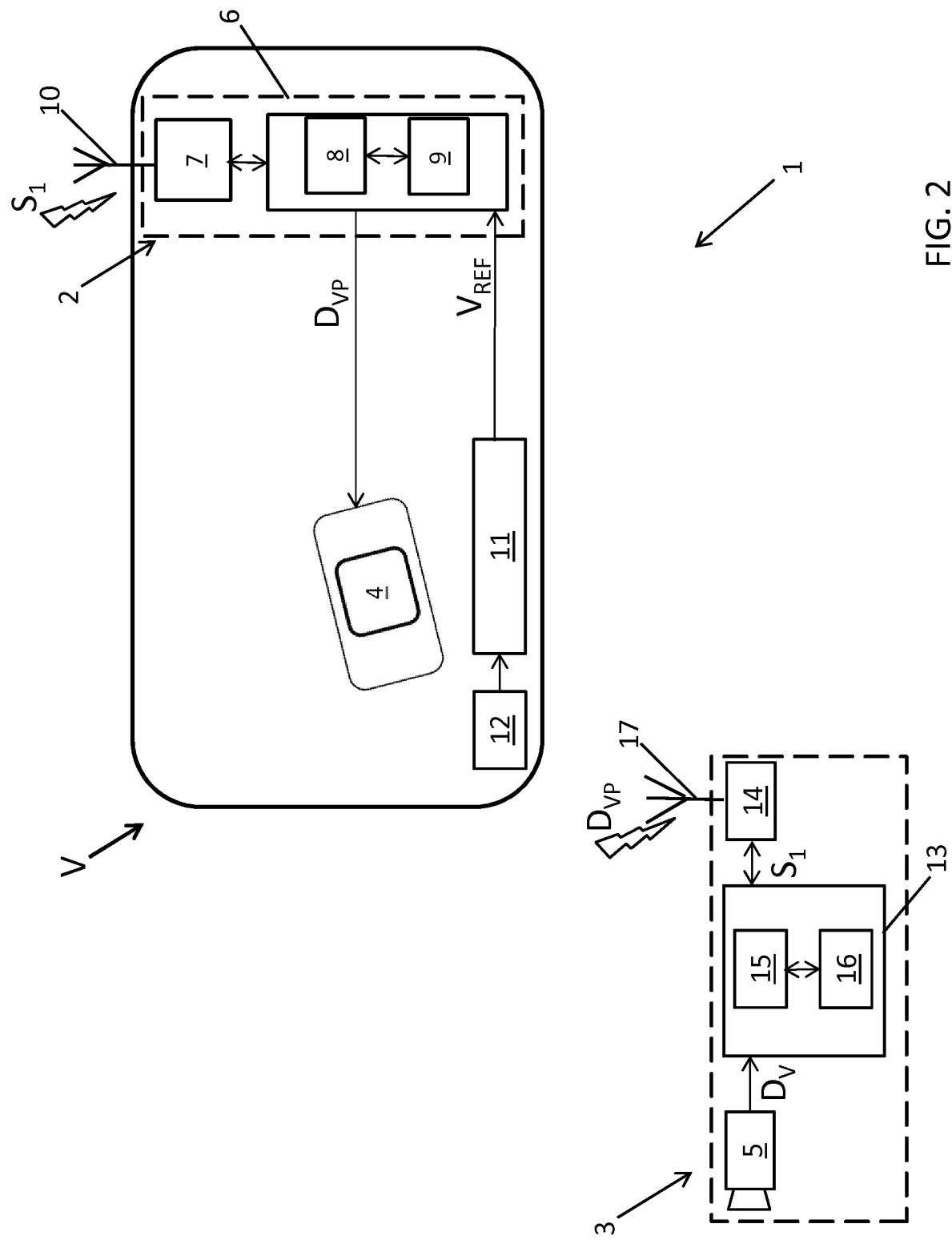
FIG. 2 illustrates schematically the vehicle imaging system shown in FIG. 1.

As shown in FIG. 2, the vehicle imaging system 1 comprises a video data receiver 2, a video data transmitter 3, and a display screen 4. The video data transmitter 3 comprises a camera 5, typically in the form of an optical video camera 5, which generates video data $D_V$ for transmission to the video data receiver 2. In use, the video data receiver 2 and the video data transmitter 3 are remote from each other and the video data $D_V$ is transmitted wirelessly. The video data $D_V$ is digital video data which is encoded by the video data transmitter 3 for transmission; and decoded by the video data receiver 2 for output to the display screen 4.

The video image is displayed on the display screen 4 at least substantially in real-time. As described herein, the video data receiver 2 is configured to output a control signal $S_1$ to control the transmission of the video data $D_V$. The control signal $S_1$ is generated in dependence on one or more operating parameter of the vehicle V and/or an operating mode of the vehicle V. The video data transmitter 3 processes the video data $D_V$ to control the transmission bit-rate in dependence on the control signal $S_1$. In order to vary the bandwidth required for the transmission, the video data transmitter 3 may modify the video data $D_V$ to alter one or more characteristic of the video image output to the display screen 4. Alternatively, or in addition, the video data transmitter 3 may implement a compression algorithm to compress the video data $D_V$. The video data transmitter 3 processes the video data $D_V$ prior to transmission (known as source coding). The vehicle imaging system 1 may thereby compensate for signal attenuation and/or multipath distortion which would otherwise prevent or delay the transmission of the video data $D_V$ at full quality.

The video data receiver 2 is disposed in the vehicle V and comprises a central processing unit 6 and a radio frequency (RF) transceiver 7. The central processing unit 6 comprises at least one electronic processor 8 coupled to system memory 9. The electronic processor 8 is configured to execute a set of software instructions held in the system memory 9. The transceiver 7 is connected to a vehicle-mounted antenna 10 for transmitting and receiving RF signals. The electronic processor 8 is configured to generate the control signal $S_1$ in dependence on one or more operating parameter of the vehicle V and/or an operating mode of the vehicle. The electronic processor 8 is coupled to a vehicle communication bus 11, such as a vehicle CAN bus, and monitors the operating parameters of the vehicle V. In the present embodiment the electronic processor 8 is configured to read a vehicle reference velocity $V_{REF}$ published to the vehicle communication bus 11. The vehicle reference velocity $V_{REF}$ is generated in conventional manner in dependence on a wheel speed signal generated by one or more rotational speed sensor 12. The control signal $S_1$ is output to the transceiver 7 and transmitted to the video data transmitter 3 to control the transmission of the video data $D_V$. It will be appreciated that the control signal $S_1$ may be generated in dependence on other operating parameters. For example, the electronic processor 8 may generate the control signal $S_1$ in dependence on a vehicle yaw angle or a rate of change of the vehicle yaw angle. The yaw angle may be measured directly by an on-board accelerometer; or measured indirectly by a steering angle.

The video data transmitter 3 in the present embodiment is mounted to the trailer T. The camera 5 is disposed in a rear-facing orientation at the rear of the trailer T. The camera 5 is coupled to a remote control unit 13 and a remote transceiver 14. The camera 5 is operable to generate video data $D_V$ of a region behind the trailer T. The remote transceiver 14 transmits (streams) the video data $D_V$ to the video data receiver 2 using a suitable wireless communication standard, such as Wi-Fi®. The remote control unit 13 comprises at least one image processor 15 coupled to local memory 16. The remote transceiver 14 comprises a remote antenna 17 which is mounted to the trailer T in the present embodiment. The image processor 15 is configured to process the video data $D_V$ prior to transmission (i.e. at source). The image processor 15 thereby functions as a digital video codec to encode the video data $D_V$ prior to transmission. The image processor 15 may modify the video data $D_V$ to change the resolution of the image (i.e. the number of pixels making up the image); and/or a colour content (or colour depth) of the image; and/or a response time (latency) of the image; and/or a frame rate of the image. The image processor 15 may modify the video data $D_V$ at source by discarding some of the video data $D_V$ in dependence on the one or more dynamic operating parameter of the vehicle V. The image processor 15 outputs processed video data $D_{VP}$ which may have a smaller size than the source video data $D_V$. By modifying the video data $D_V$, the remote control unit 13 may reduce the quantity of data transmitted to the video data receiver 2. The processed video data $D_{VP}$ may be transmitted within the available bandwidth. The type and/or extent of processing performed by the image processor 15 is controlled by the control signal $S_1$. The characteristics of the video image displayed on the display screen 4 are thereby modified in dependence on the operating parameters of the vehicle V.

Alternatively, or in addition, the image processor 15 may implement a compression algorithm to compress the video data $D_V$ prior to transmission. The compression of the video data $D_V$ may increase the response time (i.e. increased latency) of the imaging system 1. Thus, the compression performed on the video data $D_V$ may also be controlled in dependence on one or more operating parameter of the vehicle V. The image processor 15 may adjust a compression factor applied by the compression algorithm to compress the video data $D_V$ in dependence on the control signal $S_1$. The image processor 15 may perform high data compression when a high framerate is required but a low image quality (typically a low image resolution) is acceptable. The image processor 15 may perform low data compression when a low framerate is acceptable but high image quality (typically a high image resolution) is required. The processed video data $D_{VP}$ is output by the image processor 15.

The processing of the video data $D_V$ by the image processor 15 is performed in dependence on the vehicle operating mode and notably the vehicle reference speed $V_{REF}$. The degree of reduction of the response time, resolution and colour content will be balanced according to the operating mode and speed. The control signal $S_1$ is generated to ensure that the display characteristics of the video image reflect the dynamic operation of the vehicle. The operation of the image processor 15 in dependence on the control signal $S_1$ in different vehicle operating scenarios will now be described.

The image processor 15 processes the video data $D_V$ to provide a longer response time (increased latency) and a lower frame rate when the vehicle reference speed $V_{REF}$ is below a lower speed threshold. The image processor 15 may also maintain a high colour content and a high resolution of the video data $D_V$. The lower speed threshold may be defined to correspond to a scenario when the vehicle V and the trailer T are travelling at a relatively low speed. The lower speed threshold may be predefined, for example as 20 mph (approximately 30 km/h). This functionality may also be implemented when the vehicle V is reversing. In this operating mode when the vehicle is reversing, the system may transmit high-quality images with a relatively low frame rate, as it may be preferable to provide a driver with a clear view of the area behind the trailer but, as the vehicle will be moving at a relatively low speed, a low update rate may be acceptable.

The image processor 15 processes the video data $D_V$ to provide a shorter response time (reduced latency) and a higher frame rate when the vehicle reference speed $V_{REF}$ is above an upper speed threshold. The image processor 15 may maintain a medium colour content and lower the resolution of the video data $D_V$. The upper speed threshold may be predefined, for example as 60 mph (approximately 100 km/h).

When the vehicle V and the trailer T are travelling at a moderate speed, the image processor 15 processes the video data $D_V$ to provide an intermediate (medium) response time, an intermediate (medium) frame rate, a relatively high colour content and a relatively low image resolution. The moderate speed may be predefined, for example when the vehicle reference speed is above the lower speed threshold and below the upper speed threshold. In the present embodiment this corresponds to a vehicle reference speed $V_{REF}$ greater than 20 mph (approximately 30 km/h) and less than 60 mph (approximately 100 km/h).

In use, the camera 5 outputs the source video data $D_V$ to the image processor 15. The image processor 15 outputs processed video data $D_{VP}$ which is transmitted to the video data receiver 2. The video data receiver 2 decodes the processed video data $D_{VP}$ and outputs a video signal to the display screen 4. The video image is displayed to provide the vehicle driver of a substantially real-time view of the region behind the trailer T.

A further embodiment will now be described. This embodiment is a development of the embodiment described above and like reference numerals are used for like features. The imaging system 1 comprises a video data receiver 2 and a video data transmitter 3. The video data transmitter 3 is modified in this arrangement such that the image processor 15 is configured to analyse the video data $D_V$ to determine one or more dynamic operating parameters of the vehicle V. The image processor 15 may identify one or more element represented by the video data $D_V$. The image processor 15 may track movement of said element(s) over a period of time to determine one or more operating parameter of the vehicle V. By way of example, the image processor 15 may estimate the speed at which the vehicle is travelling and output an estimated vehicle reference speed $V_{REF}$ to the image processor 15. The image processor 15 processes the video data $D_V$ in dependence on the one or more operating parameter determined by the image processor 15. The processing of the video data $D_V$ corresponds to that described above in the previous embodiment. It will be appreciated that in this embodiment it is not necessary for the video data receiver 2 to transmit the control signal $S_1$ to the video data transmitter 3.

It will be appreciated that various changes and modifications may be made to the imaging system 1 described herein without departing from the scope of the present invention.

The control signal $S_1$ may comprise said one or more vehicle operating parameter. Thus, the video data receiver 2 may be configured to transmit the one or more vehicle operating parameter to the video data transmitter 3. The image processor 15 may process the video data $D_V$ directly in dependence on the one or more received vehicle operating parameter.

A further operating mode of the vehicle may comprise the vehicle being stationary and locked, in a sleep mode, and appropriate vehicle parameters identifying this mode may be transmitted to the video data transmitter 3. In this mode, the video data transmitter may obtain high-quality images, that is the video data $D_V$ has a high colour content and a high resolution, at relatively long time intervals, for example once per second, and transmit the video data to the video data receiver. In this mode, the system 1 will act as a security system, for example acquiring clear images of people approaching the vehicle or trailer.

In another operating mode, the vehicle may be parked but not in a sleep mode. In this operating mode, the video data transmitter may continue to transmit video data from the camera to the video data receiver, to enable a driver or operator to monitor the area behind the trailer, for example to observe loading or unloading of the trailer.

The vehicle parameters or vehicle operating mode may relate to any other parameter or circumstance, such as detecting off-road operation, whether automatically or through user selection of an off-road driving mode.

In the embodiments described herein, the video data $D_V$ is processed in dependence on one or more vehicle operating parameter. The video data receiver 2 may provide feedback to the video data transmitter 3 relating to signal strength and/or signal attenuation. For example, the video data receiver 2 and the video data transmitter 3 may communicate with each other to determine the available bandwidth. Ideally, the available bandwidth enables the system to capture high-quality images at the full available rate from the camera. However, where the bandwidth available falls, the system 1 selects a suitable compromise between image quality and image rate depending on the vehicle operating mode and vehicle operating parameter. The available bandwidth may be determined using any suitable method, which may be inherently provided in the transceivers 7, 14. This may comprise detecting signal strength, as is known for wifi systems, or detecting an error rate in transmitted data, or in any other suitable manner. In this arrangement, the image processor 15 may process the video data $D_V$ in dependence on said one or more vehicle operating parameter and also the available bandwidth.

The vehicle imaging system 1 described herein may be calibrated in dependence on additional factors, such as the relative positions of the video data receiver 2 and the video data transmitter 3. The relative positions may be estimated, for example based on a length of the trailer T. Alternatively, the relative positions may be determined, for example using triangulation techniques to determine the position of the data transmitter 3. A calibration process may be performed initially or periodically to check signal integrity. The vehicle imaging system 1 may be configured to compensate for a poor signal, for example by reducing the image resolution. Other checks may be made, for example of ambient light levels, so that, in low light levels, a longer exposure time at the camera may be required and consequently a lower frame rate imposed on the system 1.

The method and apparatus according to the present invention have been described herein with reference to video data $D_V$ generated by the camera 5. It will be appreciated that the method and apparatus may also be applied to audio data generated by a microphone.

The invention claimed is:

1. A video data transmitter for use with a vehicle, the video data transmitter comprising:
   a camera for generating video data;
   an image processor configured to process the video data;
   a receiver for receiving one or more control signal from a video data receiver to control processing of the video data prior to transmission, the one or more control signal being generated in dependence on a reference speed of the vehicle and in dependence on an available bandwidth of video data transmission; and
   a transmitter for transmitting the processed video data to the video data receiver which is remote from the video data transmitter;
   wherein the image processor is configured to modify a response time of the video data in dependence on the one or more control signal received from the video data receiver such that modifying the response time of the video data is performed in dependence on both the reference speed of the vehicle and the available bandwidth;
   wherein the image processor is configured to modify the video data to provide a longer response time when the vehicle is reversing;
   wherein the image processor is further configured to modify the response time in dependence on a hitch angle of the trailer.

2. The video data transmitter as claimed in claim 1, wherein processing the video data further comprises reducing a size of the video data to enable transmission within the available bandwidth.

3. The video data transmitter as claimed in claim 1, wherein processing the video data further comprises discarding a portion of the video data in dependence on the reference speed of the vehicle or compressing the video data in dependence on the reference speed of the vehicle.

4. The video data transmitter as claimed in claim 1, wherein the image processor is configured to:
   modify the video data to provide a shorter response time when the vehicle reference speed is greater than or equal to an upper speed threshold;
   modify the video data to provide a longer response time when the vehicle reference speed is no more than a lower speed threshold; and
   modify the video data to provide an intermediate response time when the vehicle reference speed is greater than the lower speed threshold and less than the upper speed threshold.

5. The video data transmitter as claimed in claim 1, wherein the image processor is configured to analyse the video data to determine the reference speed of the vehicle.

6. A trailer for coupling to a vehicle, wherein the trailer comprises the video data transmitter of claim 1.

7. A video data receiver for a vehicle, the video data receiver comprising:
   a processor configured to receive a reference speed of the vehicle and to modify a response time of the video data in dependence on the reference speed of the vehicle, wherein the processor is configured to modify the video data to provide a longer response time when the vehicle is reversing;
   a receiver for receiving processed video data transmitted wirelessly from one or more video data transmitter, the one or more video data transmitter being remote from the receiver; and
   a transmitter for transmitting a control signal to the one or more video data transmitter;
   wherein the processor is configured to generate the control signal in dependence on the reference speed of the vehicle and in dependence on an available bandwidth of video data transmission to control modification of the response time of the video data prior to transmission;
   wherein the processor is further configured to modify the response time in dependence on a hitch angle of the trailer.

8. A vehicle comprising the video data receiver of claim 7.

9. A method of controlling transmission of video data from a video data transmitter to a video data receiver disposed in a vehicle, the method comprising:
   receiving one or more control signal from the video data receiver to control processing of the video data prior to transmission, the one or more control signal being generated in dependence on a reference speed of the vehicle and in dependence on an available bandwidth of video data transmission;
   generating video data;
   processing the video data comprising modifying a response time of the video data; and
   transmitting the processed video data wirelessly to the video data receiver which is remote from the transmitter;
   wherein the video data is processed in dependence on the one or more control signal received from the video data receiver such that the modifying of the response time of the video data is performed in dependence on the reference speed of the vehicle and the available bandwidth,
   wherein the processing includes modifying the video data to provide a longer response time when the vehicle is reversing,
   wherein the processing further includes modifying the response time in dependence on a hitch angle of the trailer.

10. The method as claimed in claim 9, wherein processing the video data further comprises reducing a size of the video data to enable transmission within the available bandwidth.

11. The method as claimed in claim 9, wherein processing the video data further comprises discarding a portion of the video data in dependence on the reference speed of the vehicle, or compressing the video data in dependence on the reference speed of the vehicle.

12. The method as claimed in claim 9, further comprising:
   modifying the video data to provide a shorter response time, when the vehicle reference speed is greater than or equal to an upper speed threshold;
   modifying the video data to provide a longer response time when the vehicle reference speed is no more than a lower speed threshold; and
   modifying the video data to provide an intermediate response time when the vehicle reference speed is greater than the lower speed threshold and less than the upper speed threshold.

* * * * *